Sept. 17, 1946.   L. BODDY   2,407,810
ELECTRICAL INDICATING SYSTEM
Original Filed Feb. 13, 1942
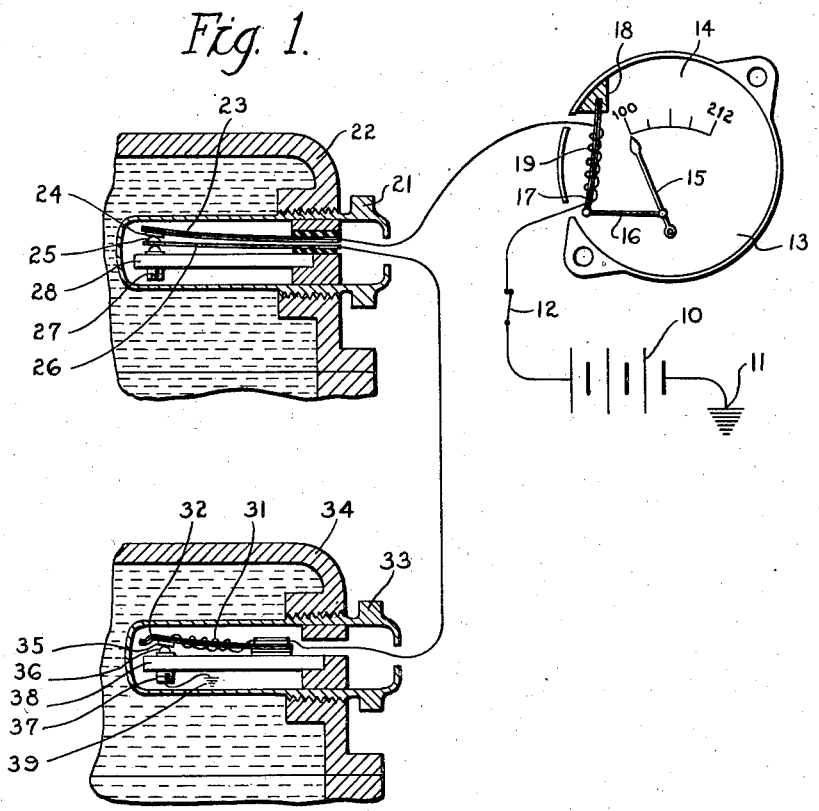
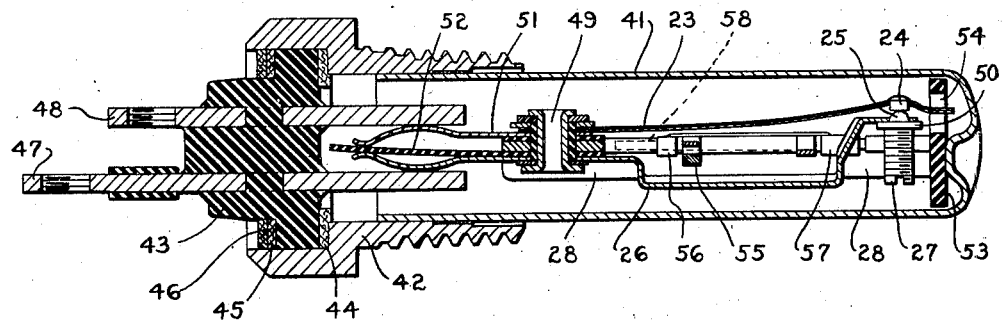
INVENTOR.
Leonard Boddy
BY
Charles S. Penfold ATTORNEY Patented Sept. 17, 1946

2,407,810

UNITED STATES PATENT OFFICE 2,407,810

ELECTRICAL INDICATING SYSTEM

Leonard Boddy, Ann Arbor, Mich., assignor to The Anderson Company, a corporation of Indiana Substitute for application Serial No. 430,785, February 13, 1942. This application November 19, 1945, Serial No. 629,552

2 Claims. (Cl. 73—347)

My invention relates to electrical indicating systems and more particularly to electrical indicating systems for indicating remotely quantitively the manifestation of a physical condition or a variable factor.

Heretofore there have been provided electrical indicating systems for continuously and accurately indicating at a remote point the quantity of a variable factor or a physical condition. One type of such system may employ a source of power subject to voltage variations and in order to provide continuous accurate indication uninfluenced by the variations of the voltage source, a series of impulses corresponding to the condition or variable factor to be indicated are transmitted to an indicating instrument which is responsive to the cumulative effect of the transmitted impulses. Compensation for variations in the voltage in the power source are accomplished by modifying the character of the transmitted impulses. An indicating system of the type which is responsive to the cumulative effect of the transmitted impulses is shown and described in United States Letters Patent No. 2,022,441 for Electric indicating instrument, granted upon the application of Theodore J. Smulski to The Anderson Company, assignee of the present invention.

It has been found in internal combustion engines having a plurality of cylinder blocks that, even though a common cooling system or radiator is provided, one of the blocks may exceed a safe temperature. For example in an internal combustion engine of the V-type it has been common to connect the water jackets of the two cylinder blocks to a common radiator and to provide forced circulation of the cooling fluid. In one of the motor blocks there has been placed a temperature responsive device for transmitting current to an indicating instrument located on the dashboard or instrument panel of the motor or vehicle. This provides an indication of the general operating temperature of the motor, but it is not sufficiently sensitive to respond to an abnormal condition occurring in the other motor block. In accordance with my invention I provide means in one of the motor blocks for providing an indication of the temperature during normal operation and means in the other cylinder block which will be responsive to any abnormal condition to provide an indication on the same instrument. In a broader view, I provide a system which is applicable to any multi-unit device and which includes means responsive to one of the units to give a relative indication of the operating temperature of all of the units, and to give an accurate indication of the operating temperature of that particular unit, and which further includes means responsive to each of the other units and effective whenever the temperature of the associated unit exceeds a predetermined amount to produce an indication on the instrument that at least one of the units has exceeded a safe or predetermined temperature.

It is therefore an object of my invention to provide a new and improved indicating system for remotely indicating a variable factor or condition and for indicating whenever said factor or any one of a number of other variable factors of like kind exceed a predetermined amount.

It is another object of my invention to provide an improved remote indicating system to show the general relative operating temperature of a device and to indicate whenever any one of a plurality of units of said device have a temperature exceeding a predetermined amount.

Still another object of my invention is to provide an improved remote indicating system for a multi-unit device which will give an indication whenever a predetermined temperature has been exceeded by any one of the units.

Other and further objects of my invention will become more readily apparent by reference to the following description taken in connection with the accompanying drawing, wherein:

Figure 1 is a fragmentary, largely schematic representation of the devices and the circuit comprising my electrical indicating system; and Figure 2 is a cross-sectional view of one of the temperature responsive units used in my system.

Referring more particularly to Figure 1 of the drawing there is shown a source of power or voltage such as battery 10, one side of which is connected to the ground 11. The source of voltage 10 may comprise a storage battery in a vehicle and, as is well known, this voltage source is subject to variations in voltage. The other side of the source of electrical power 10 is connected through a switch 12 to an indicating instrument 13 which is of the cumulative responsive type shown and described in the above mentioned Patent No. 2,022,441. This instrument is provided with a dial 14 having indications thereon for cooperation with an indicating hand 15. The indicating hand 15 is actuated through a member 16 by a bimetallic element 17 suitably mounted at 18 upon the frame or case of the instrument 13. An electrical heating element 19 is provided for heating the bimetallic element 17, and this heating element is connected in series between the switch 12 and a temperature responsive device 21.

The temperature device 21 is shown located in an opening provided in a water cooled motor block 22. The temperature responsive device 21 consists of a casing which is secured in a suitable opening in the motor block 22, and within the casing there are provided a bimetallic element 23 suitably insulated and supported within the casing 21, a contact 24 supported adjacent the end of and by the bimetallic element 23, a cooperating contact 25 mounted upon a suitable adjustable support and conductor 26 which is positioned by an adjustable screw 27 mounted in a fixed support 28. The adjustable screw 27 mounted in the fixed support 28 is provided for adjustment of the position of the lower contact 25 so as to accurately predetermine the temperature at which the bimetallic element 23 will open the contacts 24 and 25. The contact 25 is positioned so as to cause interruption of the electrical circuit whenever the temperature of the cooling medium within the block 22 exceeds a predetermined amount. The lower contact 25 and the supporting conductor 26 are electrically connected to a heating element 31 surrounding a bimetallic element 32 supported within a temperature responsive casing 33 which is supported within a suitable opening in the water jacket in the other motor block 34. The temperature responsive device 33 has the heating coil 31 for the bimetallic element 32 connected to an electrical contact 35 mounted on the end of the bimetallic element 32. The electrical contact 35 is arranged to cooperate with an electrical contact 36 adjustably supported by a screw 37 from a fixed support member 38. The adjustable contact 36 is connected to ground 39 through the adjustable screw 37 and the support 38. It therefore becomes apparent that there is provided a series circuit which may be traced from the ground 11 through battery 10, switch 12, heating coil 19 of the instrument 13, bimetallic element 23, contacts 24, 25, and the conductor 26 of the heat responsive casing 21 and through the heating coil 31, the contacts 35 and 36 to the ground 39 in the heat responsive casing or device 33.

The indicating instrument 13 is of the type which has the indicating hand 15 positioned adjacent the highest temperature on the scale whenever a minimum amount of current or no current at all is being received by the heating coil 19 of the indicating instrument. The elements within the heat responsive device 33 in the one unit 34 of a motor or other device operates to transmit a series of impulses through the elements of the heat responsive device 21 to the indicating instrument 13. The action of the bimetallic element 32 of the transmitting device 33 is such that the contacts 35 and 36 are alternately opened and closed at a relatively high rate so as to transmit impulses varying in frequency and in duration. Irrespective of the condition of the source of power 10 the transmitting device 33 requires that for each temperature or each conditon of the variable factor to be indicated there must be supplied a certain amount of heat to the bimetallic element 32. As the amount of heat received by the transmitting device 33 from the surrounding medium or from the motor block 34 increases, less electrical power is required to produce periodical opening and closing of the contacts 35 and 36 so that a decreased amount of power is received by the heating coil 19 located about or adjacent to the bimetallic element 17 of the indicating instrument 13. When this occurs the indicating hand 15 is moved toward a higher indication. If the electrical circuit is interrupted by the opening of the switch 12, no power is received by the heating coil 19 of the indicating instrument so that the bimetallic element cools to move from the warped position shown in the drawing to a substantially straight position thereby moving the hand 15 to the highest indication on the scale 14. If while the switch 12 is closed, the heat responsive device 21 reaches a temperature beyond a predetermined amount which has been considered the limit to which the motor block 22 may be safely heated, the bimetallic element 23 will open the contacts 24 and 25 thereby causing an indication to be produced on the instrument 13 showing that in one of the units of the motor the safe predetermined temperature has been exceeded.

From the circuit arrangement shown and described it will be noticed that the bimetallic element 23 of the heat responsive unit 21 serves as a conductor for the impulses being transmitted through the circuit. This produces an operation which is deemed to be desirable. If it is assumed that an abnormal condition is developing in the motor unit 22, the temperature thereof is rapidly increasing. Due to the heating effect of the current passing through the bimetallic element 23 of the heat responsive device 21, the contacts 24 and 25 will be opened at a temperature which is slightly below, by a few degrees, the temperature which should not be exceeded for any length of time in order to prevent damage to the operation of the motor. Since the temperature of that unit of the motor is increasing, more and more heat is being transmitted to the temperature responsive device 21 so that the bimetallic element 23 will continue to remain in a position where the contacts 24 and 25 will remain open thereby preventing an operating condition for a period wherein these contacts might open and close several times while the temperature of the motor unit is passing through the upper limit of the predetermined safe temperature. Thus the switch contacts 24 and 25 will not have a period of operation which might be in step with the opening and closing of the contacts 35 and 36 of the unit 33 thereby delaying the indication of the abnormal condition on the instrument 13 since this instrument is responsive to the cumulative effect of current transmitted through the circuit. While for purposes of illustration Figure 1 shows but one unit 21 responsive to a temperature in excess of a predetermined amount, it of course will be apparent that in a multi-unit device having more than two units, a plurality of series connected devices corresponding to device 21 will be employed. Each unit except one will have a device corresponding to device 21 and the remaining unit will be provided with a temperature responsive device corresponding to the device 33 which provides a continuous accurate indication of the operating temperature of that unit and also provides a relative indication of the operation of all units so long as there is no abnormal operation of any one of the individual units.

Thus the aggregate power transmitted by a series of impulses by the temperature responsive device 33 will vary inversely with respect to increases in the temperature or variable factor to be indicated. Since the indicating instrument 13 is one which in respect to the aggregate power received in the form of current impulses to produce an indication of decreased value upon an increase in the aggregate power received it is apparent that when a minimum amount of power or no power is received by the instrument that the indication is a maximum value. This maximum value is equal to or in the vicinity of the temperature value above which it is unsafe to continue the operation of the motor.

In Figure 2 there is shown a cross-sectional view of a temperature responsive device such as 21 shown in Figure 1. This device comprises a tubular casing 41 suitably soldered or secured to a support member 42 which is provided at one end with threads for cooperation with the threads in the opening of the motor block, and at the other end with a suitable surface which may be gripped by a wrench or tool to insure that the temperature responsive device is properly mounted in the motor block so as to prevent leakage of the cooling medium. The inside of the supporting member 42 is suitably recessed so as to receive a block of insulating material 43 which is positioned against a suitable packing ring 44 and retained in position by a washer 45 and a retaining ring 46. The insulating member 43 completely closes the passage to the interior of the tubular member 41, and provides means for conducting current to and from the interior by the electrical conductors 47 and 48. These electrical conductors 47 and 48 extend through the insulating material 33 so as to appear in spaced relation on the inside of the tubular portion 41.

Within the tubular portion 41 there is provided an assembly which includes bimetallic element 23 having adjacent one end thereof electrical contact 24 which cooperates with an electrical contact 25 supported by the electrical conductor 26. The conductor 26 and the contact 25 are insulated from the adjustable screw 27 adjacent the end of the frame 28 by an insulating member 50. The adjustable screw 27 permits the contact 25 to be adjusted so as to determine accurately the temperature at which the bimetallic element 23 will open the contacts 24 and 25. At one end of the frame 28 there is provided a tubular rivet or other suitable fastening means 49 which together with suitable insulating washers and collars serves to maintain the proper relation between the bimetallic element 23, the conductor 26 and the support frame 28. From this it will appear that the conductor 26 extends beyond the fastening means 49 so that one end thereof is in contact with the electrical conductor 47. Electrical conductor 51 is connected by the fastening means 49 to the bimetallic element 23, and this electrical conductor 51 is suitably separated and insulated from the conductor 26 by an insulating member 52. The electrical conductor 51 is in electrical contact with the conductor 48. The extremities of the electrical conductors 26 and 51 which are separated by the insulating member 52 are preferably of such configuration as to provide resilient means for contacting their respective electrical conductors 47 and 48.

Adjacent the far end of the tubular member 41 and abutting the end of the supporting frame 28 there is provided an insulating member 53 having an opening or aperture 54 therein. The end of the bimetallic element 23 is in the form of a projection which extends into the aperture 54 of the insulating member 53 so that when a predetermined temperature has been exceeded to cause the bimetallic element to open the contacts 24 and 25, this element 23 will be limited in its movement by the engagement of the extremity thereof with the upper edge of the aperture 54 to prevent the bimetallic element from contacting the outer tubular casing 41. That portion of the support frame 28 between the tubular rivet 49 and the adjustable screw 27 is preferably provided with an apertured portion so that about each of the outer sides of the channel-like frame 28 there may be provided resilient means for frictionally positioning the supporting member 28 within the tubular casing 41. The sides of the channel portions of the supporting member 28 are bridged by the bridge portion 55. By means of clamping portions 56 and 57 resilient members 58 are provided on each side of the support 28 to maintain in position this support within the case 41.

While the temperature responsive device 33 for transmitting current impulses to the instrument has been shown rather schematically in Figure 1, it of course will readily become apparent that the actual physical structure will have a degree of resemblance to the structure of the temperature responsive device 21 which is shown in detail in Figure 2.

While for the purpose of simplicity in illustration and to facilitate the description of the operation of my invention, there has been shown the application of my invention to a water cooled motor having two cylinder blocks, it of course will be apparent that my invention may be applied to any other devices having the same or a greater number of units in which it is desired to obtain an indication of the operating temperature of one of the units and an indication whenever a predetermined temperature is exceeded in any of the other units. For example the invention is applicable to a multi-cylinder air cooled engine in which case a device corresponding to the temperature responsive device 33 is provided for one of the cylinders, and a plurality of devices corresponding to the device 21 are provided for the remaining cylinders. All of these devices are then connected in series with the source of power and the indicating instrument. Under normal conditions the one device 33 will give an accurate indication of the operating temperature of its cylinder, and a general indication of the normal operating temperature of all of the cylinders. Upon abnormal operation of any other cylinder in excess of a safe temperature its device 21 will interrupt the circuit to produce an indication on the instrument telling the observer that an abnormal condition exists.

It therefore will become apparent that I am not to be limited by the specific disclosure or description since it is apparent that modifications may be made in the instruments, in the number of instrumentalities employed, and in the circuit arrangement without departing from the spirit and scope of my invention as set forth in the appended claims.

I claim:

1. In an indicator system for showing operating conditions in connection with an internal combustion engine having a water cooling system comprising an electrical transmission circuit, including parts for its operation, a sender extending into the water cooling system adjacent one cylinder, the sender being continuously responsive to the temperature of its environment and including a housing threadedly connected to the block of said engine, an insulated take-off terminal carried by said housing, a bimetallic element supported at one end in said housing, a contact carried by the movable opposite end of the element, a stationary contact insulated from said element electrically connected to said housing and engine, a heating element associated with and influencing the action of said bimetallic element connected to said movable contact and to said take-off terminal, a receiver including a movable indicator and a dial for continuously indicating the temperature of the sender environment, a bimetallic member actable on said indicator and a heating member associated with and influencing the action of said element, said heating member being connected to one side of a source of electrical potential, said sender and receiver being of the wattage integrator type in which the wattages converted to heat by the receiver and sender bear a constant ratio to one another regardless of variation of source voltage or of resistance in series with the sender and receiver, and such wattages diminish progressively as a dangerous environmental temperature is approached, and finally when the dangerous temperature is reached, substantially disappear because of the maintenance by the sender of substantially a continuous open condition of the circuit, and a thermo-responsive switch extended into the water cooling system adjacent a second cylinder, said switch including a housing threadedly connected to the engine block, a pair of insulated terminals supported by said housing, one of said terminals being electrically connected to the heating member associated with the receiver and the other terminal being electrically connected to the take-off terminal associated with the sender, a member having one end normally engaging said other terminal of said pair of terminals and a contact carried by its other end, and a bimetallic element having one end electrically connected to the said one terminal and a contact adjacent its other end engageable with the contact of said member, said switch being constructed and arranged to remain normally closed and being normally without effect upon the receiver indication, but to open when a dangerous temperature occurs in its environment, so that the same indication will be immediately given by the receiver in response to a dangerous condition in the environment of the switch as is given in response to a dangerous condition in the environment of the sender.

2. In an indicator system for showing operating conditions in connection with an internal combustion engine, having a fluid cooling system comprising an electrical transmission circuit, including parts for its operation, a sender extending into the fluid cooling system adjacent one cylinder, the sender being continuously responsive to the temperature of its environment and including a housing connected to the block of said engine, an insulated take-off terminal carried by said housing, a bimetallic element supported at one end in said housing, a contact carried by the movable opposite end of the element, a stationary contact insulated from said element electrically connected to said housing and engine, a heating element associated with and influencing the action of said bimetallic element connected to said movable contact and to said take-off terminal, a receiver including a movable indicator and a dial for continuously indicating the temperature of the sender environment, a bimetallic member actable on said indicator and a heating member associated with and influencing the action of said element, said heating member being connected to one side of a source of electrical potential, said sender and receiver being of the wattage integrator type in which the wattages converted to heat by the receiver and sender bear a constant ratio to one another regardless of variation of source voltage or of resistance in series with the sender and receiver, and such wattages diminish progressively as a dangerous environmental temperature is approached, and finally when the dangerous temperature is reached, substantially disappear because of the maintenance by the sender of substantially a continuous open condition of the circuit, and a thermo-responsive switch extending into the cooling system at another location spaced from said cylinder, said switch including a housing, a pair of insulated terminals supported by said housing, one of said terminals being electrically connected to the heating member associated with the receiver and the other terminal being electrically connected to the take-off terminal associated with the sender, a member having one end normally engaging said other terminal of said pair of terminals and a contact carried by its other end, and a bimetallic element having one end electrically connected to the said one terminal and a contact adjacent its other end engageable with the contact of said member, said switch being constructed and arranged to remain normally closed and being normally without effect upon the receiver indication, but to open when a dangerous temperature occurs in its environment, so that the same indication will be immediately given by the receiver in response to a dangerous condition in the environment of the switch as is given in response to a dangerous condition in the environment of the sender.

LEONARD BODDY.